(12) United States Patent
Blevins et al.

(10) Patent No.: US 9,298,176 B2
(45) Date of Patent: Mar. 29, 2016

(54) COMPENSATING FOR SETPOINT CHANGES IN A NON-PERIODICALLY UPDATED CONTROLLER

(75) Inventors: Terrence L. Blevins, Round Rock, TX (US); Mark J. Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 654 days.

(21) Appl. No.: 13/351,802

(22) Filed: Jan. 17, 2012

(65) Prior Publication Data
US 2013/0184837 A1 Jul. 18, 2013

(51) Int. Cl.
*G05B 11/01* (2006.01)
*G05B 17/02* (2006.01)

(52) U.S. Cl.
CPC .................................. *G05B 17/02* (2013.01)

(58) Field of Classification Search
None
See application file for complete search history.

(56) References Cited

U.S. PATENT DOCUMENTS

| | | |
|---|---|---|
| 3,628,129 A | 12/1971 | Riley |
| 4,149,237 A | 4/1979 | Freitas |
| 4,152,760 A | 5/1979 | Freitas et al. |
| 4,268,822 A | 5/1981 | Olsen |
| 4,303,973 A | 12/1981 | Williamson, Jr. et al. |
| 4,517,637 A | 5/1985 | Cassell |
| 4,539,655 A | 9/1985 | Trussell et al. |
| 4,726,017 A | 2/1988 | Krum et al. |
| 4,729,091 A | 3/1988 | Freeman et al. |
| 4,837,632 A | 6/1989 | Kubo et al. |
| 4,910,658 A | 3/1990 | Dudash et al. |
| 4,916,441 A | 4/1990 | Gombrich |
| 4,949,299 A | 8/1990 | Pickett |

(Continued)

FOREIGN PATENT DOCUMENTS

| | | |
|---|---|---|
| CN | 1192813 A | 9/1998 |
| CN | 1313966 A | 9/2001 |

(Continued)

OTHER PUBLICATIONS

Stability of model based networked control systems with time-varying transmission times. Author: Montestruque, L.A., published in: Automatic control, IEEE Transections on (vol. 49, Issue: 9), Date: Sep. 2004 (date of current version: Sep. 13, 2004).*

(Continued)

*Primary Examiner* — Robert Fennema
*Assistant Examiner* — Md N Mia
(74) *Attorney, Agent, or Firm* — Marshall, Gerstein & Borun LLP

(57) ABSTRACT

A technique for controlling a process using non-periodically received process variable measurements enables more robust controller responses to setpoint changes. The control technique implements iterations of a control routine to generate a control signal using a reset or rate contribution component that produces an expected process response to the control signal. When a new measurement of the process variable is unavailable to the controller, the reset or rate contribution component that was generated in response to the receipt of the previous process variable is maintained when generating the control signal. However, the reset contribution component is iteratively recalculated during each controller execution cycle so that the output of the reset contribution component incorporates expected process changes that occur as a result of a setpoint change.

22 Claims, 9 Drawing Sheets

(56) References Cited

U.S. PATENT DOCUMENTS

| | | |
|---|---|---|
| 5,088,021 A | 2/1992 | McLaughlin et al. |
| 5,099,444 A | 3/1992 | Wilson et al. |
| 5,142,550 A | 8/1992 | Tymes |
| 5,150,363 A | 9/1992 | Mitchell |
| 5,239,662 A | 8/1993 | Danielson et al. |
| 5,252,967 A | 10/1993 | Brennan, Jr. et al. |
| 5,268,834 A | 12/1993 | Sanner et al. |
| 5,268,835 A | 12/1993 | Miyagaki et al. |
| 5,307,297 A | 4/1994 | Iguchi et al. |
| 5,374,231 A | 12/1994 | Obrist |
| 5,400,246 A | 3/1995 | Wilson et al. |
| 5,400,253 A | 3/1995 | O'Connor |
| 5,451,923 A | 9/1995 | Seberger et al. |
| 5,477,449 A | 12/1995 | Iino et al. |
| 5,493,569 A | 2/1996 | Buchholz et al. |
| 5,495,482 A | 2/1996 | White et al. |
| 5,495,484 A | 2/1996 | Self et al. |
| 5,559,804 A | 9/1996 | Amada et al. |
| 5,581,247 A | 12/1996 | Kelly |
| 5,583,757 A | 12/1996 | Baca, Jr. et al. |
| 5,586,305 A | 12/1996 | Eidson et al. |
| 5,612,890 A | 3/1997 | Strasser et al. |
| 5,657,317 A | 8/1997 | Mahany et al. |
| 5,664,005 A | 9/1997 | Emery et al. |
| 5,666,530 A | 9/1997 | Clark et al. |
| 5,682,476 A | 10/1997 | Tapperson et al. |
| 5,691,896 A | 11/1997 | Zou et al. |
| 5,739,416 A * | 4/1998 | Hoenk .................. 73/29.01 |
| 5,793,963 A | 8/1998 | Tapperson et al. |
| 6,043,461 A | 3/2000 | Holling et al. |
| 6,094,602 A | 7/2000 | Schade, III |
| 6,129,449 A | 10/2000 | McCain et al. |
| 6,199,018 B1 | 3/2001 | Quist et al. |
| 6,236,334 B1 | 5/2001 | Tapperson et al. |
| 6,246,320 B1 | 6/2001 | Monroe |
| 6,285,966 B1 | 9/2001 | Brown et al. |
| 6,298,454 B1 | 10/2001 | Schleiss et al. |
| 6,437,692 B1 * | 8/2002 | Petite et al. .................. 340/540 |
| 6,775,707 B1 | 8/2004 | Bennett et al. |
| 6,970,183 B1 | 11/2005 | Monroe |
| 7,158,851 B2 | 1/2007 | Funk |
| 7,436,797 B2 | 10/2008 | Shepard et al. |
| 7,460,865 B2 | 12/2008 | Nixon et al. |
| 7,519,012 B2 | 4/2009 | Tapperson et al. |
| 7,587,252 B2 | 9/2009 | Blevins et al. |
| 7,620,460 B2 | 11/2009 | Blevins et al. |
| 7,933,594 B2 | 4/2011 | Nixon et al. |
| 7,945,339 B2 | 5/2011 | Blevins et al. |
| 8,144,622 B2 | 3/2012 | Shepard et al. |
| 8,250,667 B2 * | 8/2012 | Svensson et al. .................. 850/3 |
| 8,396,060 B2 | 3/2013 | Nagashima et al. |
| 8,719,327 B2 | 5/2014 | Blevins et al. |
| 2002/0125998 A1 | 9/2002 | Petite et al. |
| 2002/0130846 A1 | 9/2002 | Nixon et al. |
| 2003/0043052 A1 | 3/2003 | Tapperson et al. |
| 2003/0093245 A1 | 5/2003 | Schmit |
| 2003/0099221 A1 | 5/2003 | Rhee |
| 2003/0149493 A1 | 8/2003 | Blevins et al. |
| 2003/0171827 A1 | 9/2003 | Keyes et al. |
| 2004/0015609 A1 | 1/2004 | Brown et al. |
| 2004/0103165 A1 | 5/2004 | Nixon et al. |
| 2004/0117766 A1 | 6/2004 | Mehta et al. |
| 2004/0215356 A1 * | 10/2004 | Salsbury et al. ................ 700/44 |
| 2004/0260405 A1 | 12/2004 | Eddie et al. |
| 2005/0062677 A1 | 3/2005 | Nixon et al. |
| 2005/0130605 A1 | 6/2005 | Karschnia et al. |
| 2005/0267710 A1 | 12/2005 | Heavner et al. |
| 2005/0276233 A1 | 12/2005 | Shepard et al. |
| 2006/0074598 A1 | 4/2006 | Emigholz et al. |
| 2006/0077917 A1 | 4/2006 | Brahmajosyula et al. |
| 2006/0079967 A1 | 4/2006 | Roby et al. |
| 2006/0150191 A1 | 7/2006 | Masuda et al. |
| 2006/0287769 A1 | 12/2006 | Yanagita et al. |
| 2007/0010898 A1 | 1/2007 | Hosek et al. |
| 2007/0093918 A1 | 4/2007 | Blevins et al. |
| 2008/0082180 A1 | 4/2008 | Blevins et al. |
| 2009/0299495 A1 * | 12/2009 | Blevins et al. .................. 700/28 |
| 2012/0123583 A1 * | 5/2012 | Hazen et al. .................. 700/110 |
| 2013/0013091 A1 * | 1/2013 | Cavalcanti et al. ............ 700/90 |
| 2013/0184837 A1 | 7/2013 | Blevins et al. |

FOREIGN PATENT DOCUMENTS

| | | |
|---|---|---|
| DE | 102004029022 | 2/2005 |
| DE | 10304902 | 9/2012 |
| EP | 0 277 006 A2 | 8/1988 |
| EP | 0 491 657 A1 | 6/1992 |
| GB | 2283836 A | 5/1995 |
| GB | 2 431 752 A | 5/2007 |
| GB | 2 440 167 | 1/2008 |
| GB | 2 452 617 A | 3/2009 |
| GB | 2 475 629 A | 5/2011 |
| JP | 1165609 A | 6/1989 |
| JP | 05-158502 A | 6/1993 |
| JP | 6-035502 A | 2/1994 |
| JP | 06332506 A | 12/1994 |
| JP | 07004769 A | 1/1995 |
| JP | 798606 | 4/1995 |
| JP | 7-160307 A | 6/1995 |
| JP | 10-224239 A | 8/1998 |
| JP | 2001036542 A | 2/2001 |
| JP | 2006059214 A | 3/2006 |
| JP | 04307608 B2 | 8/2009 |
| JP | 05252564 B2 | 7/2013 |
| NZ | 216109 A | 8/1989 |
| NZ | 227231 A | 1/1991 |
| NZ | 239534 A | 11/1993 |
| WO | WO-01/35190 | 5/2001 |
| WO | WO-2004109984 A2 | 12/2004 |
| WO | WO-2006/107933 A1 | 10/2006 |

OTHER PUBLICATIONS

"Competency in Process Control—Industry Guidelines," EnTech Control Engineering Inc., Version 1.0, (1994).

"Configuring CL6010, CL6210, and CL7010 Series Interactive and Computing Controllers, FG4.2:CL6011," Fisher Contols publication, pp. 6-46 (1985).

"The En Tech Report," http://www.emersonprocess.com/solutions/services/entech/publications/index.asp, pp. 1-4 (Oct. 24, 2005).

Advant® OCS with Master Software, "Functional Untis Part 2 AI AO DI DO," User's Guide (1997).

Advent® OCS with Master Software, "Functional Untis Part 4 PIDCON RATIOSTN MANSTN," User's Guide (1997).

Advisory Action for U.S. Appl. No. 11/850,810, filed Nov. 28, 2011.

Aspentech, "Analysis of Data Storage Technologies for the Management of Real-Time Process Manufacturing Data," Analysis of Information Management, Retrieved from the Internet Aug. 17, 2007: URL http://www.aspentech.com/publication_files/White_Paper_for_IP_21.pdf.

Caro, "Wireless Networks for Industrial Automation," *ISA* (2004).

Chen, "Real-Time Data Management in the Distributed Environment," Ph.D. Thesis, University of Texas at Austin (1999).

Chinese Office Action for Application No. 200610149998.7, dated Dec. 4, 2009.

Chinese Office Action for Application No. 200610149999.1, dated Dec. 4, 2009.

Chinese Office Action for Application No. 200810135579.7, dated Feb. 13, 2012.

Chinese Office Action for Application No. 201110021318.4, dated Dec. 8, 2011.

Communication of a Notice of Opposition for European Application No. 08163662.3, dated Dec. 27, 2011.

Eccles, "IEEE-1451.2 Engineering Units Conversion Algorithm," *Sensors* (1999).

EnTech Control Engineering Inc., "Automatic Controller Dynamic Specification," Available at: URL http://www.emersonprocess.com/entechcontrol/download/publications/control.pdf.

European Search Report for Application No. EP08163662.3, dated Jan. 26, 2009.

(56) References Cited

OTHER PUBLICATIONS

Examination Report for Application No. GB0620421.8, dated Jul. 26, 2010.
Examination Report for Application No. GB0816097.0, dated Feb. 14, 2012.
Freescale Semiconductor,"Welcome to Freescale Semiconductor," Retreived from the Internet on Aug. 17, 2007: URL http://www.freescale.com/.
HART Communication Foundation: Common Practice Command Specification, HCF_SPEC-151, Revision 9.0 (2007).
HART Field Communications Protocol, Application Guide, HCF LIT 34 (1999).
Hieb, "Developing a Small Wireless Control Network," Master's Thesis, University of Texas at Austin (2003).
IEC, "Telecontrol Equipment and Systems—Part 5-101: Transmission Protocols—Companion Standard for Basic Telecontrol Tasks," IEC 60870-5-101 (2003).
IEEE, "IEEE Wireless Standards Zone," Retrieved from Internet on Aug. 17, 2007: URL http://standards.ieee.org/wireless/.
Japanese Office Action for Application No. 2006-289675, dated Nov. 22, 2011.
Japanese Office Action for Application No. 2006-289928, dated Nov. 22, 2011.
Japanese Office Action for Application No. 2009-244331, dated Nov. 22, 2011.
Johnson, "Vital Link to Process Control," *Control Engineering*, 52(10) (2005).
Lee, "Smart Transducers (Sensors or Actuators), Interfaces, and Networks," Electronic Instrument Handbook, Chapter 47 (2004).
Liptak, Bela G., "Sample -and hold Algorithms," *Instrument Engineers Handbook*, Third Edition, Process Control, p. 29 (1995).
LonMark® Functional Profile: Pressure Sensor, Version 1.0, Pressure Sensor: 1030 (1997).
LonMark® Functional Profile: Pump Controller, Version 1.0, Pump Controller: 8120 (2003).
Miskowicz, "Send-On-Delta Concept: An Event-Based Data Reporting Strategy," Sensors, 6:49-63 (2006).
Montestruque et al., "On the Model-Based Control of Networked Systems," *Automatica*, 39:1837-1843 (2003).
Montestruque et al., "Stability of Model-Based Networked Control Systems with Time-Varying Transmission Times," *IEEE Transactions on Automatic Control*, 49.9:1562-1572 (2004).
Office Action for U.S. Appl. No. 11/258,676, dated May 12, 2008.
Office Action for U.S. Appl. No. 11/258,676, dated Sep. 17, 2008.
Office Action for U.S. Appl. No. 11/499,013, dated Sep. 18, 2008.
Office Action for U.S. Appl. No. 11/850,810, dated Dec. 10, 2010.
Office Action for U.S. Appl. No. 11/850,810, dated Jun. 28, 2011.
Office Action for U.S. Appl. No. 11/850,810, dated Jun. 7, 2010.
Office Action for U.S. Appl. No. 11/850,810, dated Nov. 9, 2009.
Office Action for U.S. Appl. No. 12/537,778, dated Apr. 5, 2010.
Office Action for U.S. Appl. No. 12/537,778, dated Oct. 21, 2010.
Search Report for Application No. GB0620420.0, dated Feb. 12, 2007.
Search Report for Application No. GB0620421.8, dated Feb. 2, 2007.
Search Report for Application No. GB0816097.0, dated Oct. 24, 2008.
Shinskey, F. Greg, "The Power of External-Reset Feedback," *Control*, pp. 53-63 (May 2006).
Shinskey, F.G., "Sampled Integral Controller," *Feedback Controllers for the Process Industry*, p. 93 (1994).
Shinskey, F.G., "Sampling Controllers," *Process Control Systems*, Third Edition, pp. 161-162 (1988).
U.S. Appl. No. 13/351,802, filed Jan. 17, 2012.
Vasyutynaskyy et al., "Towards Comparison of Deadband Sampling Types," Proceedings of the IEEE International Symposium on Industrial Electronics, pp. 2899-2904 (2007).
Wei, Yang, "Implementation of IEC61499 Distributed Function Block Architecture for Industrial Measurement and Control Systems (IPMCS)," National University of Singapore, Department of Electrical & Computer Engineering, (2001/2002).

Chinese Office Action for Application No. 201010514547.5, dated Sep. 22, 2011.
Examination Report for Application No. GB0620420.0, dated Jun. 22, 2010.
Examination Report for Application No. GB0620421.8, dated Mar. 21, 2011.
Examination Report for Application No. GB0816097.0, dated Apr. 24, 2013.
Search Report for Application No. GB1300657.2, dated Jun. 13, 2013.
Notice of Reasons for Rejection for Japanese Patent Application No. 2006-289928, dated Jul. 31, 2012.
Notice of Reasons for Rejection for Japanese Patent Application No. 2006-289675, dated Jul. 31, 2012.
Notice of Reasons for Rejection for Japanese Patent Application No. 2009-244331, dated Jul. 31, 2012.
Examination Report for Great Britain Patent Application No. GB0816097.0, dated Dec. 18, 2012.
"LONMARK Functional Profile: Pressure Sensor" [online], 1997, LONMARK Interoperability Association. Available from http://web.archive.org/web/20030910010803/http://www.lonmark.org/profiles/1030_10.PDF [Accessed Dec. 13, 2012], in particular see pasasage in section "Send on delta" on pp. 5 and 6.
Notice of Reasons for Rejection for Japanese Patent Application No. 2008-223363, mailed Dec. 4, 2012.
Second Office Action for Chinese Patent Application No. 200810135579.7, issued Jan. 7, 2013.
"Cellular Digital Packet Data Reduces SCADA Costs", reprinted from The American Oil and Gas Reported, Aug. 1997, 4 pages.
"FloBoss 500 Flow Manager", Fisher Controls International. Inc., 2 pages, Sep. 1996.
"The Fisher R0C306 and R0C312", Fisher Controls International, Inc., 2 pages, Jun. 1997.
"The Fisher R0C364.", Fisher Controls International, Inc., 2 pages, Jul. 1996.
Chinese Office Action for Application No. 200810135579.7 dated Sep. 18, 2013.
D.A. Roberts, "OLCHFA" A Distributed Time-Critical Fieldbus, IEE, UK, London, Digest No. 1993/189, Oct. 1993, pp. 6/1-6/3.
Decision of Refusal for Japanese Application No. 2008-223363, dated Dec. 17, 2013.
Examination report, Great Britain Patent Application No. 0620421.8, dated Mar. 21, 2011.
Fourth Office Action, Chinese Patent Application No. 200810135579.7, dated Feb. 21, 2014.
Japanese Office action for Patent Application No. Hei 8-513089 dated Sep. 29, 2005.
Office Action of the German Patent and Trademark office, German Patent Application No. 10 2006 049 832.1, received Feb. 9, 2015.
Search Report for Application No. GB0611940.8, dated Sep. 21, 2006.
Second Office Action, Chinese Patent Application No. 200610149999.1, issued Sep. 1, 2010.
Astrom et al., "Advanced PID Control," ISA, pp. 85-86 (2006).
Astrom et al., "Event Based Control, "Analysis and Design of Nonlinear Control Systems, Springer Verlag, pp. 127-147 (2007).
Blevins et al., "PID Advances in Industrial Control," IFAC Conference on Advances in PID Control PID'12, (2012).
Blevins et al., "PID Control Using Wireless Measurements," IEEE 2014 American Control Conference.
Blevins et al., Control Loop Foundation—Batch and Continuous Processes, ISA, pp. 266, 270, 393.
Chen et al., "Similarity-Based Traffic Reducing to Increase Battery Life in a Wireless Process Control Network," (2005). Retrieved from the Internet at: URL:http://knowledge.deltav.com/Controlloop2/media/docs/.
Han et al., "Control Over WirelessHART Network," 36th Annual Conference of the IEEE Industrial Electronics Society (2010).
International Search Report and Written Opinion for Application No. PCT/US2015/021713, dated Aug. 12, 2015.

(56) References Cited

OTHER PUBLICATIONS

Lian et al., "Network design consideration for distributed control systems" IEEE Transactions on Control Systems Technology, 10(2):297-307 (2002).

Nixon et al., "Meeting Control Performance Over a Wireless Mesh Network," Automation Science and Engineering, pp. 540-547 (2008).

Olfati-Saber et al., "Consensus Problems in Networks of Agents with Switching Topology and Time-Delays" IEEE Transactions on Automatic Control, 49(9):1520-1533 (2004).

Rabi et al., "Event-Triggered Strategies for Industrial Control Over Wireless Networks," In Proceedings of 4th Annual International Conference on Wireless Internet (2008).

Siebert et al., "WirelessHART Successfully Handles Control," Chemical Process, Jan. (2011).

Tatikonda et al., "Control Under Communication Constraints", IEEE Transactions on Automatic Control, 49(7):1056-1068 (2004).

Wong et al., "Systems with Finite Communication Bandwidth Contraints—Part I & II," IEEE Transactions on Automatic Control (1997).

* cited by examiner

COMPENSATING FOR SETPOINT CHANGES IN A NON-PERIODICALLY UPDATED CONTROLLER

TECHNICAL FIELD

This patent relates to compensating for setpoint changes in a wireless process control system that uses non-periodic control communications and more particularly, to a device and method configured to robustly accommodate setpoint changes occurring while implementing a non-periodically updated controller in a wireless process control system.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Emerson Process Management, use function blocks or groups of function blocks referred to as modules located in the controller or in different field devices to perform control and/or monitoring operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, monitoring a device, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a Smith Predictor or Model Predictive Control (MPC).

To support the execution of the routines, a typical industrial or process plant has a centralized control room communicatively connected with one or more process controllers and process I/O subsystems, which, in turn, are connected to one or more field devices. Traditionally, analog field devices have been connected to the controller by two-wire or four-wire current loops for both signal transmission and the supply of power. An analog field device that transmits a signal to the control room (e.g., a sensor or transmitter) modulates the current running through the current loop, such that the current is proportional to the sensed process variable. On the other hand, analog field devices that perform an action under control of the control room is controlled by the magnitude of the current through the loop.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the monitoring applications or control routines typically require periodic updates of the process variables for each iteration of the routine. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

It has been suggested to use wireless I/O communication networks to alleviate some of the difficulties associated with hardwired I/O networks. For example, U.S. Patent Application Publication No. 2003/0043052, entitled "Apparatus for Providing Redundant Wireless Access to Field Devices in a Distributed Control System," the entire disclosure of which is hereby expressly incorporated by reference herein, discloses a system utilizing wireless communications to augment or supplement the use of hardwired communications.

Reliance on wireless communications for control-related transmissions has traditionally been limited due to, among other things, reliability concerns. As described above, modern monitoring applications and process control relies on reliable data communication between the controller and the field'devices to achieve optimum control levels. Moreover, typical controllers execute control algorithms at fast rates to quickly correct unwanted deviations in the process. Undesirable environmental factors or other adverse conditions may create intermittent interferences that impede or prevent the fast communications necessary to support such execution of monitoring and control algorithms. Fortunately, wireless networks have become much more robust over the last decade, enabling the reliable use of wireless communications in some types of process control systems.

However, power consumption is still a complicating factor when using wireless communications in process control applications. Because wireless field devices are physically disconnected from the I/O network, the field devices typically need to provide their own power source. Accordingly, field devices may be battery powered, draw solar power, or pilfer ambient energy such as vibration, heat, pressure, etc. For these devices, energy consumed for data transmission may constitute a significant portion of total energy consumption. In fact, more power may be consumed during the process of establishing and maintaining a wireless communication connection than during other important operation performed by the field device, such as the steps taken to sense or detect the process variable being measured. To reduce power consumption in wireless process control systems and thus prolong battery life, it has been suggested to implement a wireless process control system in which the field devices, such as sensors, communicate with the controller in a non-periodic manner. In one case, the field devices may communicate with or send process variable measurements to the controller only when a significant change in a process variable has been detected, leading to non-periodic communications with the controller.

One control technique that has been developed to handle non-periodic process variable measurement updates uses a control system that provides and maintains an indication of an expected process response to the control signal produced by the controller between the infrequent, non-periodic measurement updates. An expected process response may be developed by a mathematical model that calculates an expected process response to a control signal for a given measurement update. One example of this technique is described in U.S. Pat. No. 7,587,252, entitled, "Non-Periodic Control Communications in Wireless and Other Process Control Systems," the entire disclosure of which is hereby expressly incorporated by reference herein. In particular, this patent discloses a control system having a filter that generates an indication of an expected process response to a control signal upon the receipt of a non-periodic process variable measurement update and that maintains the generated indication of the expected process response until the arrival of the next non-periodic process variable measurement update. As another example, U.S. Pat. No. 7,620,460, entitled "Process Control With Unreliable Communications," the entire disclosure of which is hereby expressly incorporated by reference herein, discloses a system that includes a filter that provides an indication of an expected response to the control signal but further modifies the filter to incorporate a measurement of the time that has elapsed since a last non-periodic measurement update to generate a more accurate indication of the expected process response.

However, in many control applications, a process control system may receive a setpoint change during process operation. Generally, when a setpoint is changed during the execution of a periodically updated control system (e.g. a hardwired control communication system), a controller that is designed to take proportional action on the error between the setpoint and the measured process variable will immediately change the controller output to drive the process variable towards the new steady state value. However, in a wireless control system that receives infrequent, non-periodic measurement updates that operates as described in both of the examples above, the measured process response reflected by each new measurement update reflects changes made in the controller output taken on account of the last measurement update in addition to changes in the output resulting from the setpoint change made sometime after the last measurement update was received. In this case, the calculation of the controller reset component based on the controller output and the time since the last measurement update (as described in U.S. Pat. No. 7,620,460) may over compensate for changes made after the last measurement update. The process response to a setpoint change may therefore differ based on when the setpoint change was made after the last measurement update. As a result, this system does not respond as quickly or as robustly to a setpoint change because the controller continues to rely on a previously generated (and now outdated) indication of the expected response when developing the control signal after a change in the setpoint.

SUMMARY

A new control technique allows for the compensation of setpoint changes during operation of a control routine used in a control system that relies on non-periodic, wireless measurement updates within a controller. The controller that implements the new control technique includes a continuously updated filter that generates a new indication of an expected response of the process for each control routine iteration of the controller. When a setpoint change occurs, the continuously updated filter produces a response that reflects any change in the controller output resulting from the setpoint change in its calculations because the indication of the expected response is calculated anew during each control routine iteration. When a new measurement value update is available, an integral output switch coupled to the output of the continuously updated filter uses a newly calculated indication of an expected response provide by the filter as the integral feedback contribution portion to the control signal. When a new measurement value update is not available at the controller, the integral output switch delivers a previously calculated indication of an expected response as the integral feedback contribution portion to the control signal.

A control method for compensating for setpoint changes during operation of a control routine used in a control system that provides non-periodic, wireless measurement updates to the controller implements a continuously updated filter to generate an indication of an expected response for each control routine iteration of the controller. The method includes implementing iterations of a control routine to generate a control signal, and generating an integral feedback contribution to the control signal for each iteration of the control routine. When an indication of a response to the control signal is unavailable, the method maintains the integral feedback contribution that was generated from the previous communication of the response indication. Additionally, the method uses the integral feedback contribution to generate the control signal upon receiving the response indication. In generating the integral feedback contribution, the method determines the integral feedback contribution in accordance with the generated integral feedback contribution of a previous control routine iteration and a controller execution period.

A method of controlling a process includes implementing, on a computer processing device, multiple iterations of a control routine to generate a control signal including, during each iteration of the control routine, generating an integral feedback contribution for use in producing the control signal and using the integral and a derivative feedback contribution to generate the control signal. The method thereafter uses the control signal to control the process. Generally speaking, generating the integral and derivative feedback contribution includes determining an integral feedback contribution value for the current iteration of the control routine from an integral feedback contribution value of a preceding iteration of the control routine. However, using the integral feedback contribution to generate the control signal includes using the integral feedback contribution for the current iteration of the control routine when a new process response indication is received and using an integral feedback contribution that was generated from a previous iteration of the control routine, e.g., the iteration at which the preceding communication of a process response indication was received from the process, when a new process response indication to the control signal is not received from the process.

Moreover, a device for controlling a process includes a processor, a communication interface coupled to the processor to receive a process variable indication, a computer readable medium and a control routine stored on the computer-readable medium. The control routine executes on the processor to produce a control signal based on the process variable indication, wherein the control routine executes during each of a plurality of execution cycles to generate the control signal. During each execution cycle, the control routine generates an integral feedback contribution to the control signal in accordance with the generated integral feedback contribution of a previous control routine execution cycle. The control routine uses the integral feedback contribution to generate the control signal for the current execution cycle when a new process variable indication is received via the communication interface and otherwise uses the integral feedback contribution that was generated from the execution cycle of the control routine at which the preceding communication of a process variable indication was received via the communication interface to generate the control signal when a new process variable indication is not received via the communication interface.

Still further, a controller for producing a control signal to control a process based on a setpoint and a set of non-periodic measurements from the process includes a setpoint input that receives a setpoint value, a process variable input that receives non-periodic measurements of a process variable, and a control signal generation unit coupled to the setpoint input and the process variable input that produces a control signal during each of a set of controller iterations based on the setpoint value, a measurement of the process variable and an integral feedback contribution. Moreover, the controller includes a continuously updated filter that generates a new value of the integral feedback contribution for each of the plurality of controller iterations, wherein the continuously updated filter generates each new value of the integral feedback contribution in accordance with the generated integral feedback contribution value of a previous controller iteration, and the control signal produced by the control signal generation unit. Still further, the controller includes an integral switch coupled between the continuously updated filter and the control signal generation unit. The integral switch provides an integral feedback contribution value that was generated by the continuously updated filter during a previous controller iteration as a result of the receipt of a previous communication of the process variable measurement to the control signal generation unit when a new process variable measurement value is unavailable at the process variable input and provides the integral feedback contribution value that was generated by the continuously updated filter as a result of a current controller iteration to the control signal generation unit when a new process variable measurement value is available at the process variable input.

DETAILED DESCRIPTION

A new control technique enables a controller that receives process measurement signals as feedback signals in a non-periodic manner to more accurately compensate for setpoint changes made between measurement updates, to thereby provide for more robust controller dynamics. In particular, a continuously updated filter within the controller generates an indication of an expected process response (also called a feedback contribution) during each control routine iteration of the controller, despite receiving process variable measurement value updates non-periodically from field devices. The continuously updated filter uses, in part, a previously generated indication of an expected response from the last control routine iteration and the control routine execution period to generate the indication of an expected response during each control routine iteration. In addition, an integral output switch within the controller provides an output of the continuously updated filter as a feedback contribution, such as an integral (also known as reset) and/or a derivative (also known as rate) contribution, based on the newest measurement indication, to the control signal. Generally speaking, the integral output switch maintains the expected process response generated by the continuously updated filter at the time that the last measurement value update was received by the controller as the integral or reset contribution to the control signal. When a new measurement value update is available, the integral output switch clamps onto a new indication of the expected process response generated by the continuously updated filter (based on an indication of the new measurement value update), and provides the new expected process response as the integral or rate contribution of the control signal. As a result, the controller using the continuously updated filter determines a new expected response of the process during each controller iteration, wherein each new expected process response reflects the impact of a setpoint change or a feedforward change that was made in the time between measurement updates and that affects the controller output during development of the control signal, even though the integral or reset component of control signal is changed only when a new measurement value is available at the controller.

Figure 1:
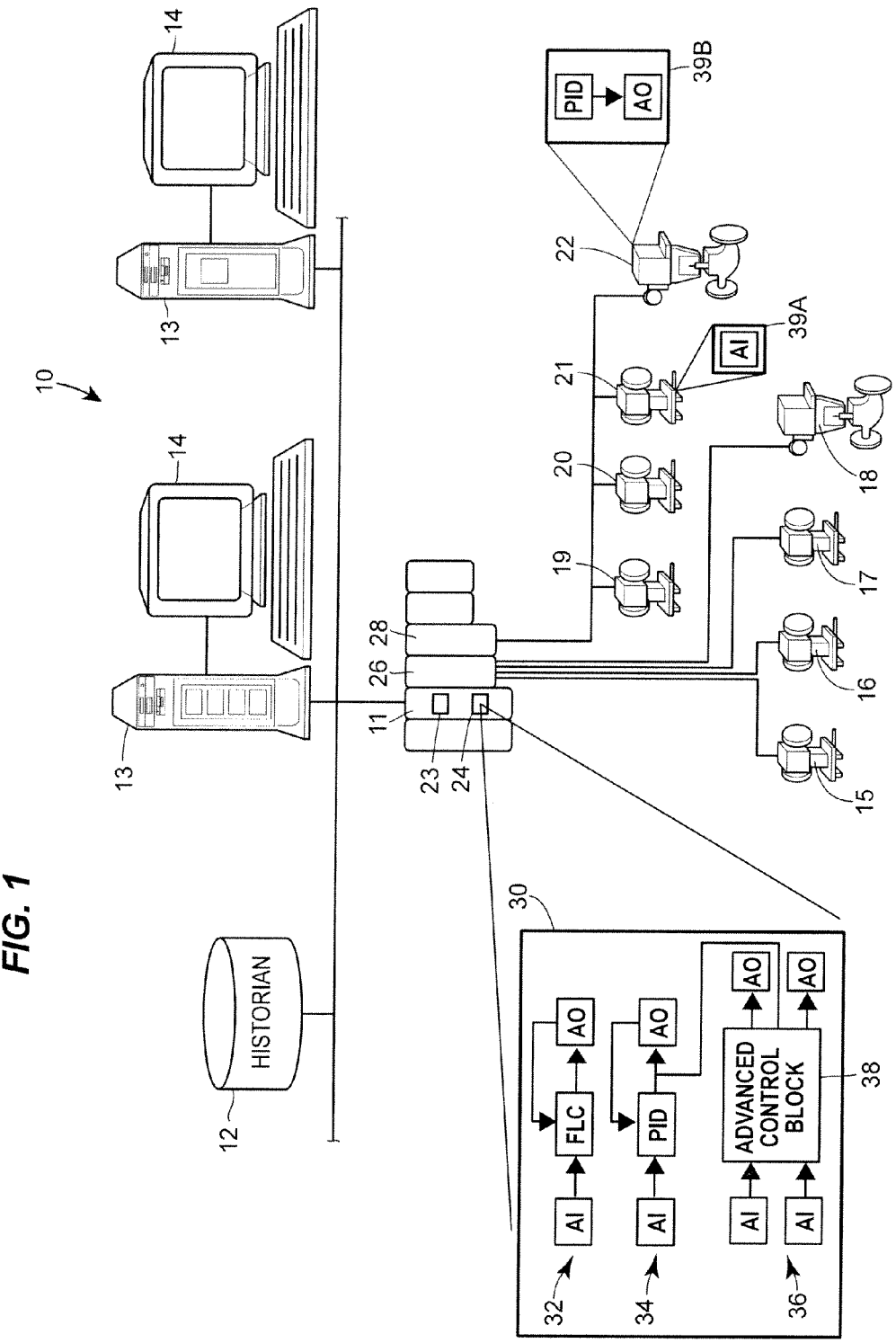
FIG. 1 is a block diagram of an example, periodically updated, hard-wired process control system.

A process control system 10 illustrated in FIG. 1 that may be used to implement the control methodology described herein includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The controller 11 is, in FIG. 1, communicatively connected to the field devices 15-22 using a hardwired communication network and communication scheme.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the devices 15-22, the host computers 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist and may be utilized herein. The function blocks may be stored in and executed by the controller 11 or other devices as described below.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the stand-alone controller 11 or, alternatively, can be located in and executed by any other processing device or control element of the process control system, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID or other control block in communication with an analog output (AO) block, as illustrated in FIG. 1.

Figure 2:
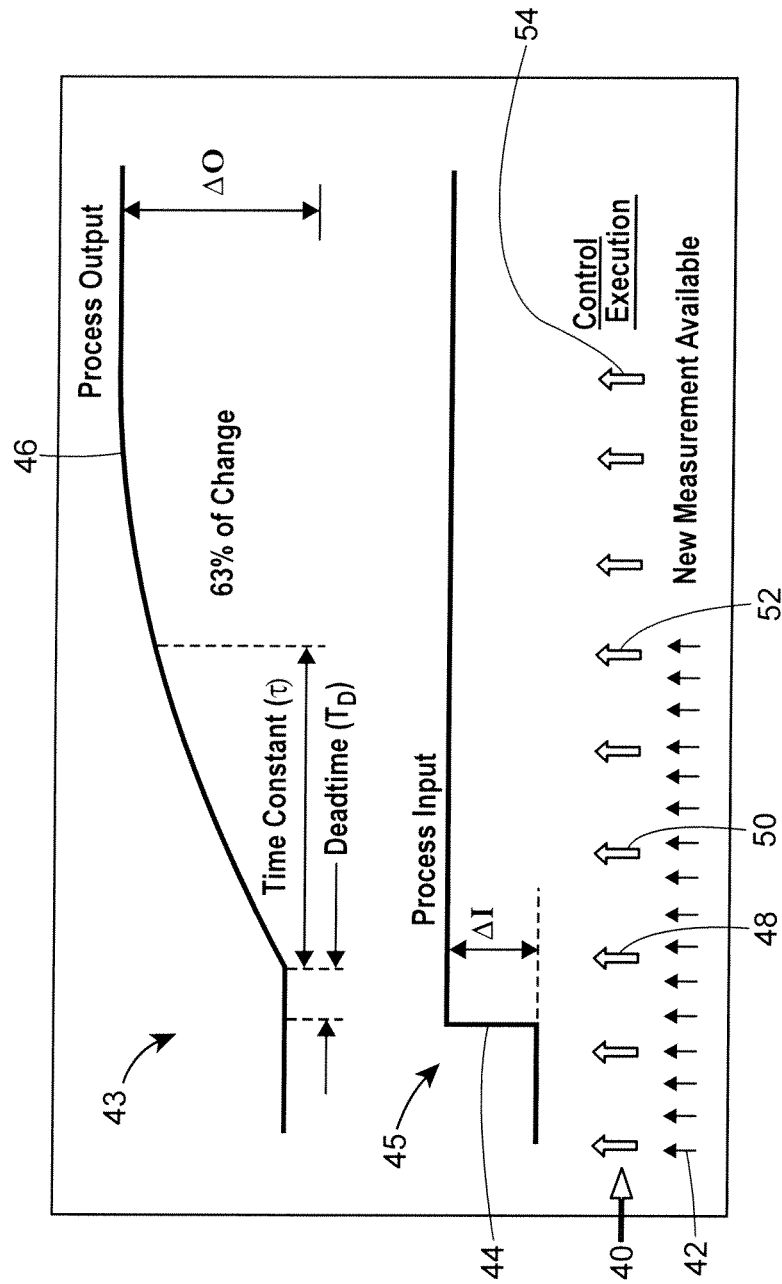
FIG. 2 is graph illustrating a process output response to a process input for an example periodically updated, hard-wired process control system.

The graph of FIG. 2 generally illustrates a process output developed in response to a process input for a process control system based on the implementation of one or more of the control loops 32, 34 and 36 (and/or any control loop incorporating the function blocks residing in the field devices 21 and 22 or other devices). The control routine being implemented generally executes in a periodic manner over a number of controller iterations with the times of the control routine execution being indicated in FIG. 2 along the time axis by the thick arrows 40. In a conventional case, each control routine iteration 40 is supported by an updated process measurement indicated by the thin arrows 42 provided by, for instance, a transmitter or other field device. As illustrated in FIG. 2, there are typically multiple periodic process measurements 42 made and received by the control routine between each of the periodic control routine execution times 40. To avoid the restrictions associated with synchronizing the measurement value with control execution, many known process control systems (or control loops) are designed to over-sample the process variable measurement by a factor of 2-10 times. Such over-sampling helps to ensure that the process variable measurement is current for use in the control scheme during each control routine execution or iteration. Also, to minimize control variation, conventional designs specify that feedback based control should be executed 4-10 times faster than the process response time. The process response time is depicted in a process output response curve 43 of the graph of FIG. 2 as being the time associated with a process time constant ($\tau$) (e.g., 63% of the process variable change) plus a process delay or deadtime ($T_D$) after an implementation of a step change 44 in a process input (shown in the lower line 45 of FIG. 2). In any event, to satisfy these conventional design requirements, the process measurement value updates (indicated by the arrows 42 of FIG. 2) have been sampled and provided to the controller at a much faster rate than the control routine execution rate (indicated by the arrows 40 of FIG. 2), which in turn is much faster or higher than the process response time.

Figure 3:
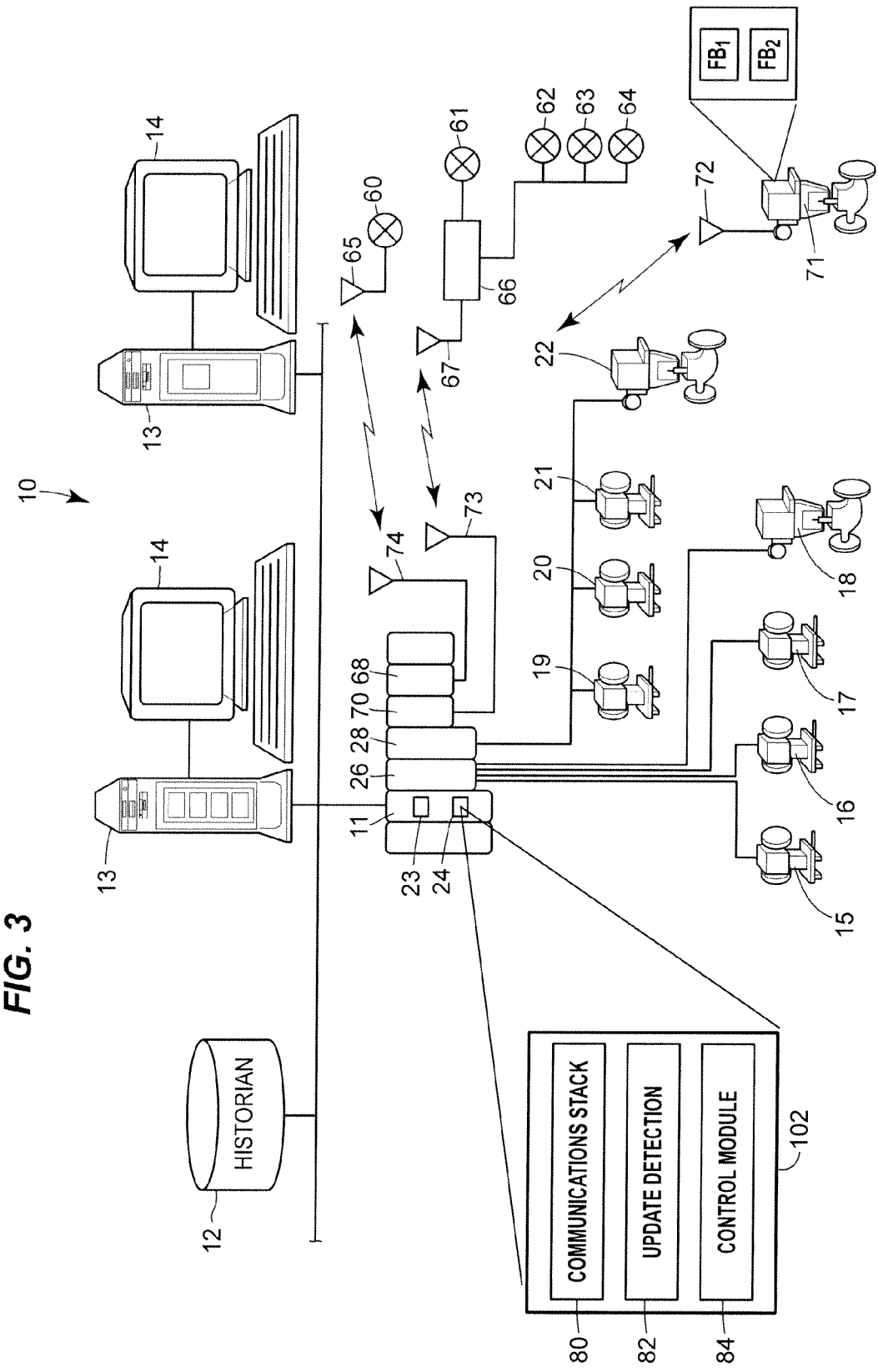
FIG. 3 is a block diagram illustrating an example of a wireless process control system having a controller that receives non-periodic feedback input.

However, obtaining frequent and periodic measurement samples from the process may not be practical or even possible when a controller is operating in process control environment in which, for example, the controller receives measurements wirelessly from one or more field devices. In particular, in these cases, the controller may only be able to receive non-periodic process variable measurements, and/or the time between the non-periodic or even periodic process variable measurements may be greater than the control routine execution rate (indicated by the arrows 40 of FIG. 2). FIG. 3 depicts an exemplary wireless process control system 10 that may implement the use of non-periodic wireless communications of process control data or process variable measurements at a controller 11.

The control system 10 of FIG. 3 is similar in nature to the control system 10 of FIG. 1, with like elements being numbered the same. However, the control system 10 of FIG. 3 includes a number of field devices 60-64 and 71 which are wirelessly communicatively coupled to the controller 11 and potentially to one another. As illustrated in FIG. 3, the wirelessly connected field device 60 is connected to an antenna 65 and cooperates to communicate wirelessly with an antenna 74 which is, in turn, coupled to a wireless I/O device 68. Moreover, the field devices 61-64 are connected to a wired-to-wireless conversion unit 66 which is, in turn, connected to an antenna 67. The field devices 61-64 communicate wirelessly through the antenna 67 with an antenna 73 connected to a further wireless I/O device 70. As also illustrated in FIG. 3, the field device 71 includes an antenna 72 which communicates with one or both of the antennas 73 and 74 to thereby communicate with the I/O devices 68 and/or 70. The I/O devices 68 and 70 are, in turn, communicatively connected to the controller 11 via a wired backplane connection (not shown in FIG. 3). In this case, the field devices 15-22 remain hardwired to the controller 11 via the I/O devices 26 and 28.

The process control system 10 of FIG. 3 generally uses the wireless transmission of data measured, sensed by or computed by the transmitters 60-64 or other control elements, such as the field device 71, as described below. In the control system 10 of FIG. 3, it will be assumed that new process variable measurements or other signal values are transmitted to the controller 11 by the devices 60-64 and 71 on a non-periodic basis, such as when certain conditions are satisfied. For example, a new process variable measurement value may be sent to the controller 11 when the process variable value changes by a predetermined amount with respect to the last process variable measurement value sent by the device to the controller 11. Of course, other manners of determining when to send process variable measurement values in a non-periodic manner may be implemented as well or instead.

As will be understood, each of the transmitters 60-64 of FIG. 3 may transmit a signal indicative of a respective process variable (e.g., a flow, a pressure, a temperature or a level signal) to the controller 11 for use in one or more control loops or routines or for use in a monitoring routine. Other wireless devices, such as the field device 71, may receive process control signals wirelessly, and/or be configured to transmit other signals indicative of any other process parameter. Generally speaking, as illustrated in FIG. 3, the controller 11 includes a communications stack 80 that executes on a processor to process the incoming signals, a module or a routine 82 that executes on a processor to detect when an incoming signal includes a measurement update, and one or more control modules 84 which execute on a processor to perform control based on the measurement updates. The detection routine 82 may generate a flag or other signal to denote that data being provided via the communications stack 80 includes a new process variable measurement or other type of update. The new data and the update flag may then be provided to one or more of the control modules 84 (which may be function blocks) which are then executed by the controller 11 at a predetermined periodic execution rate, as described in further detail below. Alternatively, or in addition, the new data and the update flags may be provided to one or more monitoring modules or applications executed in the controller 11 or elsewhere in the control system 10.

The wireless (or other) transmitters of FIG. 3 generally result in non-periodic, which includes irregular or otherwise less frequent data transmissions, between the field devices 60-64 and 71 and the controller 11. As noted above, however, the communication of measurement values from the field devices 15-22 to the controller 11 has traditionally been structured to be performed in a periodic manner to, in turn, support the periodic execution of the control routine(s) within the controller 11. As a result, the control routines in the controller 11 are generally designed for periodic updates of the process variable measurement values used in the feedback loops of the controller 11.

To accommodate the non-periodic or otherwise unavailable measurement updates (and other unavailable communication transmissions) introduced by the wireless communications between some of the field devices and the controller 11, the control and monitoring routine(s) of the controller 11 may be restructured or modified as described below to enable the process control system 10 to function properly when using non-periodic or other intermittent updates, and especially when these updates occur less frequently than the execution rate of the controller 11. An exemplary control scheme configured to operate using non-periodic control-related communications is illdstrated in more detail in FIG. 4A, which schematically illustrates a process controller 100 coupled to a process 101. The control scheme implemented by the controller 100 (which may be the controller 11 of FIGS. 1 and 3 or a control element of a field device, e.g., one of the wireless field devices of FIG. 3, etc.) generally includes the functionality of the communications stack 80, the update detection module 82 and one or more of the control modules 84 illustrated and described in connection with FIG. 3.

Figure 4A:
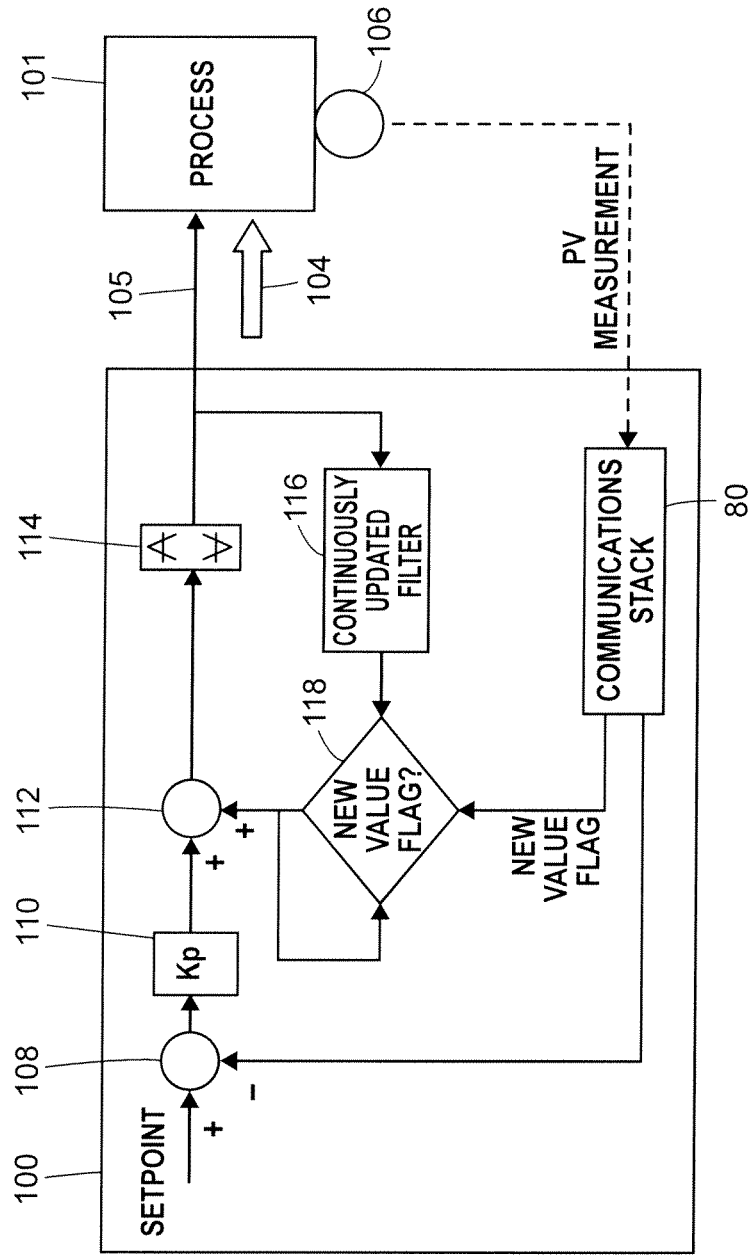
FIG. 4A is a block diagram of an example controller that allows for robust compensation of setpoint changes or feed-forward disturbances in a non-periodically updated, wireless process control system.

In the exemplary system of FIG. 4A, the controller 100 receives a setpoint signal from, for example, one of the workstations 13 (FIGS. 1 and 3) or from any other source within or in communication with the process control system 10 and operates to generate one or more control signals 105 which are provided from an output of the controller 100 to the process 101. Besides receiving the control signal 105, the process 101 may be subjected to measured or unmeasured disturbances schematically shown by the arrow 104. Depending on the type of process control application, the setpoint signal may be changed at any time during control of the process 101, such as by a user, a tuning routine, etc. Of course, the process control signals 105 may control an actuator associated with a valve or may control any other field device to affect a response in the operation of the process 101. The response of the process 101 to changes in the process control signals 105 is measured or sensed by a transmitter, sensor or other field device 106, which may, for example, correspond to any one of the transmitters 60-64 illustrated in FIG. 3. The communication link between the transmitter 106 and the controller 100 may include a wireless connection and is illustrated in FIG. 4A using a dashed line.

In a simple embodiment, the controller 100 may implement a single/input, single/output closed-loop control routine, such as a PI control routine, which is one form of a PID control routine. Accordingly, the controller 100 includes several standard PI controller elements, including a communications stack 80, and a control signal generation unit including a summing block 108, a proportional gain element 110, a further summing block 112 and a high-low limiter 114. The control routine 100 also includes a direct feedback path including a filter 116 and an integral output switch that includes a selection block 118. The filter 116 is coupled to the output of the high-low limiter 114 and the block 118 of the switch is coupled to the output of the filter 116 and provides the integral or reset contribution or component of the control signal being generated by the controller 100 to the summing block 112.

During operation of the controller 100, the summing block 108 compares the setpoint signal with the most recently received process variable measurement value provided from the communications stack 80 within the controller 100 to produce an error signal. The proportional gain element 110 operates on the error signal by, for example, multiplying the error signal by a proportional gain value $K_p$ to produce a proportional contribution or component of the control signal. The summing block 112 then combines the output of the gain element 110 (i.e., the proportional contribution) with the integral or reset contribution or component of the control signal produced by the feedback path to produce a control signal that is not limited in nature. The limiter block 114 then performs high-low limiting on the output of the summer 112 to produce the control signal 105 to be sent to control the process 101.

Importantly, the filter 116 and the block or switch 118 within the feedback path of the controller 100 operate to produce the integral or reset contribution component of the control signal in the following manner. The filter 116, which is coupled to receive the output of the limiter 114, produces an indication of the expected process response to the control signal 105 based on the output value of the limiter 114 and the execution period or time of the control algorithm 100. The filter 116 provides this expected process response signal to the switch or block 118. The switch or block 118 samples and clamps the output of the filter 116 at the output of the switch or block 118 whenever a new process variable measurement value has been received and maintains this value until the next process variable output is received at the communications stack 80. As such, the output of the switch 118 remains the output of the filter 116 that was sampled at the last measurement update.

The expected process response to changes in the output of the summer 108, as produced by the filter 116, may be approximated using a first order model as described in more detail below. More generally, however, the expected process response may be produced using any appropriate model of the process 101, and is not limited to a model incorporated in a feedback path of the controller 100, or to a filter or a model associated with determining an integral or reset contribution for a control signal. For example, controllers utilizing a model to provide the expected process response may incorporate a derivative contribution such that the control routine 100 implements a PID control scheme. Several examples that incorporate exemplary types of derivative contributions are described below in connection with FIGS. 6-8.

Prior to discussing the operation of the filter 116 of FIG. 4A in more detail, it is useful to note that a traditional PI controller may be implemented using a positive feedback network to determine the integral or reset contribution. Mathematically, it can be shown that the transfer function for a traditional PI implementation is equivalent to the standard formulation for unconstrained control, i.e., where the output is not limited. In particular:

$$\frac{O(s)}{E(s)} = K_P\left(1 + \frac{1}{sT_{Reset}}\right)$$

where $K_P$=Proportional Gain
$T_{Reset}$=Reset, seconds
$O(s)$=Control Output
$E(s)$=Control Error One advantage of using the positive feedback path within the controller 100 as illustrated in FIG. 4A is that the reset contribution is automatically prevented from winding up when the controller output is high or low limited, i.e., by the limiter 114.

In any event, the control technique described below enables using the positive feedback path for determining the reset or integral contribution when the controller receives non-periodic updates of the process variable, while still enabling a robust controller response in the event of setpoint changes or feed-forward changes that occur between the receipt of new process variable measurements. Specifically, to provide robust setpoint change controller operation, the filter 116 is configured to calculate a new indication or value of an expected process response during each or every execution of the controller 100 regardless of whether this output of the filter is ever provided to the summing block 112. As a result, the output of the filter 116 is regenerated anew during each execution cycle of the controller routine, even though only the output of the filter 116 generated immediately after the controller 100 receives a new process measurement update from communications stack 80 is used as the integral or reset contribution in the summer 112.

In particular, the new indication of the expected response as produced by the filter 116 is calculated during each controller execution cycle from the current controller output (i.e., the control signal after the limiter 114), the indication of an expected response produced by the filter 116 produced during the last (i.e., immediately preceding) controller execution cycle, and the controller execution period. As a result, the filter 116 is described herein as being continuously updated because it is executed to produce a new process response estimation during each controller execution cycle. An example equation that may be implemented by the continuously updated filter 116 to produce a new expected process response or filter during each controller execution cycle is set forth below:

$$F_N = F_{N-1} + (O_{N-1} - F_{N-1}) * \left(1 - e^{\frac{-\Delta T}{T_{Reset}}}\right)$$

where $F_N$=New filter output
$F_{N-1}$=Filter output last execution $O_{N-1}$=Controller output last execution $\Delta T$=Controller execution period Here, it will be noted that the new filter output $F_N$ is iteratively determined as the most previous filter output $F_{N-1}$ (i.e., the current filter output value) plus a decaying component determined as the difference between the current controller output value $O_{N-1}$ and the current filter output value $F_{N-1}$ multiplied by a factor dependent on the reset time $T_{Reset}$ and the controller execution period $\Delta T$. Using a filter that updates continuously in this manner, the control routine 100 is better able to determine the expected process response when calculating the integral control signal input when a new process variable measurement is received, thereby being more reactive to a changes in the setpoint or other feed-forward disturbances that occur between the receipt of two process variable measurements. More particularly, it will be noted that a change in the setpoint (without the receipt of a new process measurement value) will immediately result in a change in the error signal at the output of the summer 108 which changes the proportional contribution component of the control signal and thus changes the control signal. As a result, the filter 116 will immediately begin producing a new expected response of the process to the changed control signal and will thus update its output prior to the controller 100 receiving a new process measurement value. Then, when the controller 100 receives a new process measurement value, and a sample of the filter output is clamped to the input of the summer 112 by the switch 118 to be used as the integral or reset contribution component of the control signal, the filter 116 has iterated to an expected process response that, to some degree at least, has reacted to or incorporated the response of the process 101 to the change in the setpoint.

In the past, such as in the systems described in U.S. Pat. Nos. 7,587,252 and 7,620,460, the reset contribution filter used in a feedback path of a non-periodically updated controller only calculated a new indication of an expected response when a new process variable measurement value was available. As a result, the reset contribution filter did not compensate for setpoint changes or feed-forward disturbances that occurred between receipt of process variable measurements because the setpoint changes or feed-forward disturbances were wholly independent from any measurement value updates. For example, if a setpoint change or feed-forward disturbance occurred between two measurement updates, the expected process response of the controller was likely to be distorted because the calculation of the new indication of the expected response was based on the time since the last measurement update and the current controller output 105. As a result, the filter 116 could not begin to account for the time changes in the process (or the control signal) that resulted from a setpoint change (or other feed-forward disturbance) that occurred between the receipt of two process variable measurement values at the controller.

As will be understood, however, the control routine 100 of FIG. 4A provides an expected process response by basing its calculations on non-periodic measurement values while, in addition, determining the expected response between the receipt of two measurement values to account for changes caused by a change in the setpoint (or any measured disturbance used as a feed-forward input to the controller 100). Thus, the control technique described above is able to accommodate for setpoint changes, feed-forward action on measured disturbances, etc., that may affect the expected process response and thus provide a more robust control response.

As will be understood, the control technique illustrated in FIG. 4A calculates an indication of an expected response via the continuously updated filter 116 (e.g. the reset contribution filter) for each execution of the control block or routine 100. Here, the controller 100 configures the continuously updated filter 116 to calculate a new indication of an expected response for each execution of the control block. However, to determine if the output of the filter 116 should be used as an input to the summing block 112, the communications stack 80 and, in some examples, the update detection module 82 (FIG. 3), process the incoming data from the transmitter 106 to generate a new value flag for the integral output switch 118 when a new process variable measurement value is received. This new value flag informs the switch 118 to sample and clamp the filter output value for this controller iteration to the input of the summer 112.

Regardless of whether a new value flag is communicated, the continuously updated filter 116 continues to calculate an indication of an expected response for each iteration of the control routine. This new indication of an expected response is delivered to the integral output switch 118 each execution of the control block. Depending on the presence of the new value flag, the integral output switch 118 switches between allowing the new indication of the expected response from the continuously updated filter 116 to pass through to the summing block 112 and maintaining the signal that was previously delivered to the summing block 112 during the last execution of the control block. More particularly, when a new value flag is communicated, the integral output switch 118 allows the most recently calculated indication of the expected response from the continuously updated filter 116 to pass to the summing block 112. Conversely, if the new value flag is not present, then the integral output switch 118 resends the indication of the expected response from the last control block iteration to the summing block 112. In other words, the integral output switch 118 clamps onto the new indication of the expected response each time a new value flag is communicated from the stack 80, but does not allow any newly calculated indication of the expected response to reach the summing block 112 if a new value flag is not present.

This control technique allows the continuously updated filter 116 to continue to model the expected process response regardless of whether a new measurement value is communicated. If the control output changes as a result of a setpoint change or a feed-forward action based on a measured disturbance, irrespective of the presence of a new value flag, the continuously updated filter 116 correctly reflects the expected process response by calculating a new indication of an expected response at each control routine iteration. However, the new indication of the expected response (i.e. the reset contribution or integration component) will only be incorporated into the controller calculations when a new value flag is communicated (via the integral output switch 118).

Figure 4B:
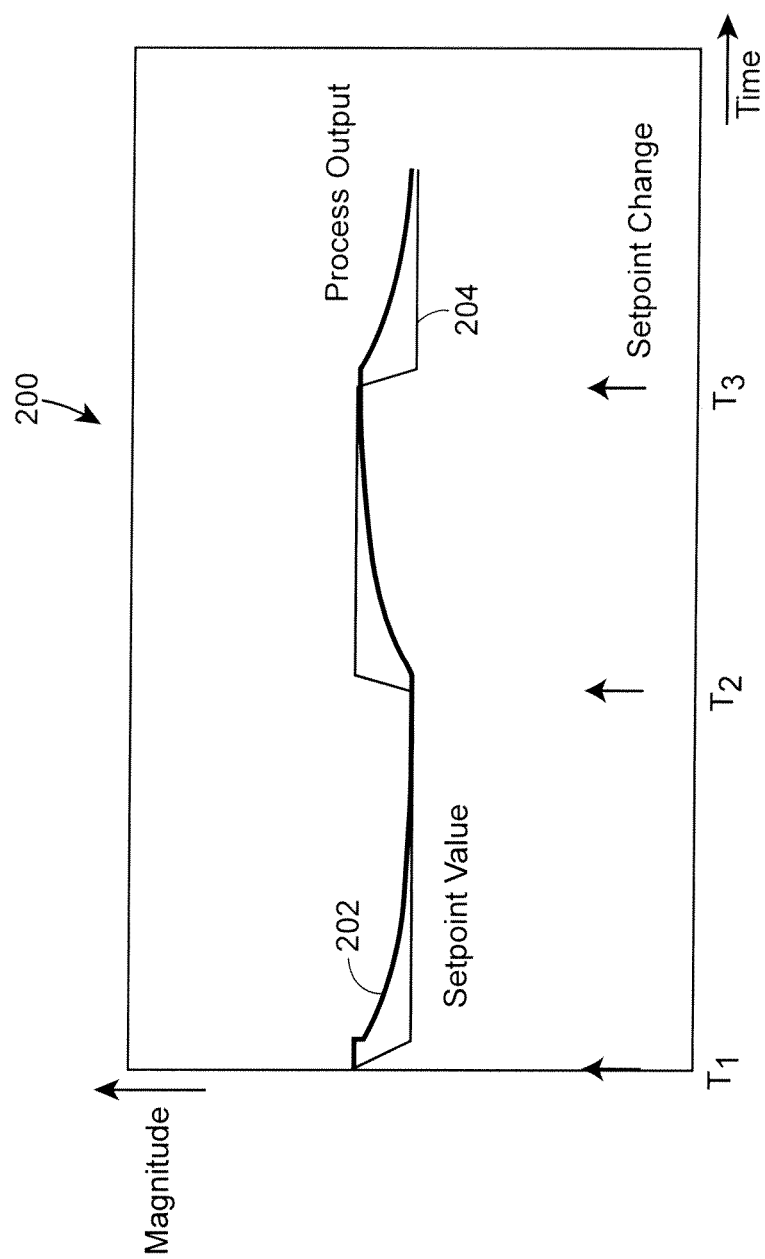
FIG. 4B is a graph illustrating the process output response of an example controller of FIG. 4A as the controller responds to several setpoint changes.

A graph 200 illustrated in FIG. 4B depicts a simulated operation of the controller 100 of FIG. 4A in driving a process output signal 202 to a steady state value as the controller 100 responds to several setpoint changes. In FIG. 4B, a process output signal 202 (illustrated as a bold line) is shown vis-à-vis a setpoint value signal 204 (illustrated as a thinner line) during wireless operation in a process control system. When a setpoint change occurs, as indicated by the arrows along the time axis at the bottom of the graph 200, the controller 100 responds by producing a control signal that drives the process output to react to the new setpoint value (i.e. steady state value). For example, as illustrated in FIG. 4B, a setpoint change occurs at the time $T_1$ as evidenced by the setpoint value signal 204 significantly changing its magnitude from a higher value to a lower value. In response, the controller 100 drives the process variable associated with the setpoint to the new steady state or setpoint value in a smooth transient curve as exhibited by the output signal 202 between the times $T_1$ and $T_2$. Similarly, in FIG. 4B, a second setpoint change occurs at the time $T_2$ as evidenced by the magnitude of setpoint value signal 204 significantly changing from a lower value to a higher value. In response, the controller 100 controls the process variable associated with the setpoint change to the new steady state or setpoint value in a smooth transient curve as shown by the output signal 202 between the times $T_2$ and $T_3$. As a result, as can be seen from FIG. 4B, the controller 100 implementing the control routine described above allows for compensation of setpoint changes in a non-periodic wireless control system in a robust manner. Because feed-forward disturbances may be measured and included in the control action, the controller 100 implementing the control routine described above may also allow for compensation of feed-forward changes in the control output in a non-periodic wireless control system.

It should be noted that the simple PI controller configuration of FIG. 4A uses the output of the filter 116 directly as the reset contribution to the control signal, and in this case the reset'contribution of a closed-loop control routine (e.g. the continuously updated filter equation presented above) may provide an accurate representation of the process response in determining whether the process exhibits steady-state behavior. However, other processes, such as deadtime dominant processes, may require the incorporation of additional components in the controller of FIG. 4A in order to model the expected process response. With regard to processes that are well represented by a first-order model, the process time constant may generally be used to determine the reset time for the PI (or PID) controller. More specifically, if the reset time is set equal to the process time constant, the reset contribution generally cancels out the proportional contribution such that, over time, the control routine 100 reflects the expected process response. In the example illustrated in FIG. 4A, the reset contribution may be effected by a positive feedback network having a filter with the same time constant as the process time constant. While other models may be utilized, the positive feedback network, filter, or model provides a convenient mechanism for determining the expected response of a process having a known or approximated process time constant. For those processes that require PID control, the derivative contribution, also known as rate, to the PID output may also be recomputed and updated only when a new measurement is received. In those cases, the derivative calculation may use the elapsed time since the last new measurement. Some examples of controllers that may use other controller components to control more complex processes using non-periodic receipt of process measurements, but that may use the filtering technique of FIG. 4A to provide for robust control in response to setpoint changes will be described below in conjunction with FIGS. 5-8.

Figure 5:
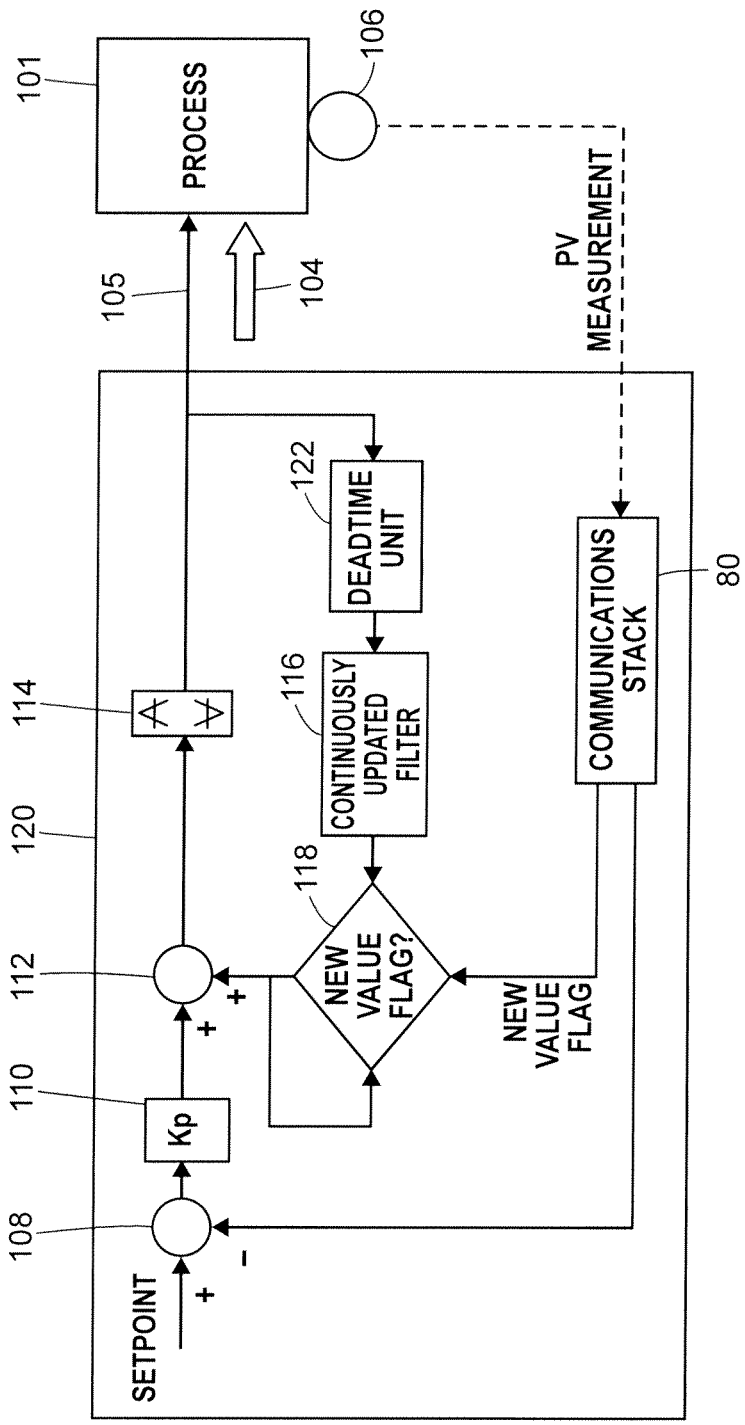
FIG. 5 is a block diagram of an example controller that performs setpoint change compensation in a non-periodically updated process control system in which the controller compensates for a process and/or measurement delay in the feedback signal.

Referring now to FIG. 5, an alternative controller (or control element) 120 configured in accordance with the control technique, as described above, is similar in many respects to the controller 100 illustrated in FIG. 4A. As a result, elements common to both controllers are identified with like reference numerals. The controller 120, however, incorporates an additional element into the control routine that determines the expected process response between measurement transmissions. In this case, the process 101 may be characterized as having a considerable amount of deadtime and, as a result, a deadtime unit or a block 122 is included in the controller model for deadtime compensation. The incorporation of the deadtime unit 122 generally helps to arrive at a more accurate representation of the process response. More specifically, the deadtime unit 122 may be implemented in any desired fashion and may include or utilize methods common to Smith predictors or other known control routines. However, in this situation, the continuously updated filter 116 and the switch module 118 operate in the same manner as described above with respect to the controller 100 of FIG. 4A to provide for robust control in response to setpoint changes.

Figure 6:
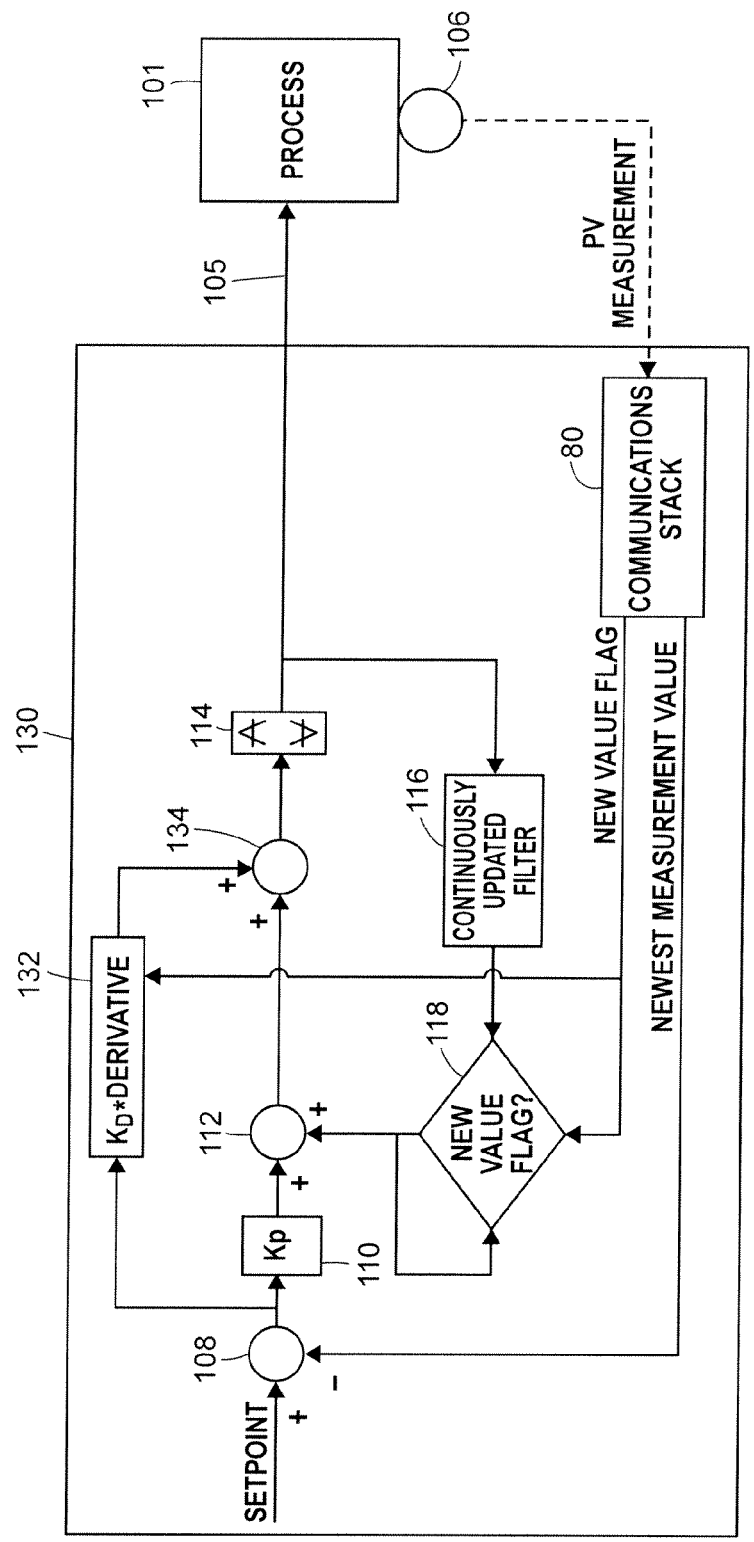
FIG. 6 is a block diagram of an example controller that performs setpoint change compensation in a non-periodically updated process control system in which the process controller uses a derivative, or a rate, contribution to determine a control signal.

FIG. 6 depicts another alternative controller (or control element) 130 that differs from the controller 100 described above in FIG. 4A in that a derivative, or rate, contribution component is incorporated into the controller 130. By incorporating the derivative contribution, the control routine implemented by the controller 130 includes an additional feedback mechanism such that, in some cases, a proportional-integral-derivative (PID) control scheme is implemented.

The control routine or technique of FIG. 6 includes a derivative contribution that is configured in a manner similar to that described above in connection with the integral contribution of FIG. 4A to accommodate non-periodic or otherwise unavailable updates of the process measurement. The derivative contribution may be restructured to be based on the elapsed time since the last measurement update. In this manner, a spike in the derivative contribution (and the resultant output signal) is avoided. More particularly, the derivative contribution of FIG. 6 is determined by a derivative block 132 that receives the error signal from the summing block 108 in parallel with the elements dedicated to the proportional and integral contributions. While other PID configurations may also be utilized (e.g., a serial configuration), the proportional, integral and derivative contributions are combined at a summing block 134 as shown in FIG. 6.

To accommodate unreliable transmissions and, more generally, the unavailability of measurement updates, the derivative contribution is maintained at the last determined value until a measurement update is received, as indicated by the new value flag from the communications stack 80. This technique allows the control routine to continue with periodic execution according to the normal or established execution rate of the control routine. Upon reception of the updated measurement, the derivative block 132, as illustrated in FIG. 6, may determine the derivative contribution in accordance with the following equation:

$$O_D = K_D \cdot \frac{e_N - e_{N-1}}{\Delta T}$$

where $e_N$=Current error
$e_{N-1}$=Last error
$\Delta T$=Elapsed time since a new value was communicated
$O_D$=Controller derivative term
$K_D$=Derivative gain factor With this technique for determining the derivative contribution, the measurement updates for the process variable (i.e., control input) can be lost for one or more execution periods without the production of output spikes. When the communication is reestablished, the term ($e_N$-$e_{N-1}$) in the derivative contribution equation may generate the same value as that generated in the standard calculation of the derivative contribution. However, for a standard PID technique, the divisor in determining the derivative contribution is the execution period. In contrast, the control technique utilizes the elapsed time between two successfully received measurements. With an elapsed time greater than the execution period, the control technique produces a smaller derivative contribution, and reduced spiking, than the standard PID technique.

To facilitate the determination of the elapsed time, the communications stack 80 may provide the new value flag described above to the derivative block 132 as shown in FIG. 6. Alternative examples may include or involve detection of a new measurement, or update, based on its value. Also, the process measurement may be used in place of the error in the calculation of the proportional or derivative component. More generally, the communication stack 80 may include or incorporate any software, hardware or firmware (or any combination thereof) to implement a communications interface with the process 101, including any field devices within the process 101, process control elements external to the controller, etc. However, in the controller 130 of FIG. 6, the continuously updated filter 116 and the switch module 118 operate the same as described above with respect to the controller 100 of FIG. 4A to provide for robust control in response to setpoint changes.

An actuator or other downstream element controlled by the controllers described in connection with FIGS. 3, 4A, and 5-6 may still receive a control signal with sudden changes, especially after periods of no communication between the controller or control element to the downstream actuator or other element. The resultant control action may be sufficiently abrupt in some cases to impact plant operations and such abrupt changes may lead to unsuitable levels of instability.

The potential for abrupt control changes because of loss of communications between the controller and the downstream element may be addressed by incorporating actual downstream data in place of the controller output during the last execution period when determining the feedback contribution(s) to the control signal. Generally speaking, such actual downstream data provides a feedback indication of a response to the control signal, and thus may be measured or calculated by a downstream element (e.g., a process control module) or a device (e.g., an actuator) that receives the control signal. Such data is provided in lieu of an implied response to the control signal, such as the controller output from the last execution. As shown in FIGS. 4A and 5-6, the continuously updated filter 116 receives the control signal 105 as an implied indication of the downstream response. The use of such implied data effectively assumes that the downstream element, such as an actuator, received the communications of the control signal and, thus, is responding appropriately to the control signal. The actual feedback data also differs from other response indications, such as the measurement of the process variable being controlled.

Figure 7:
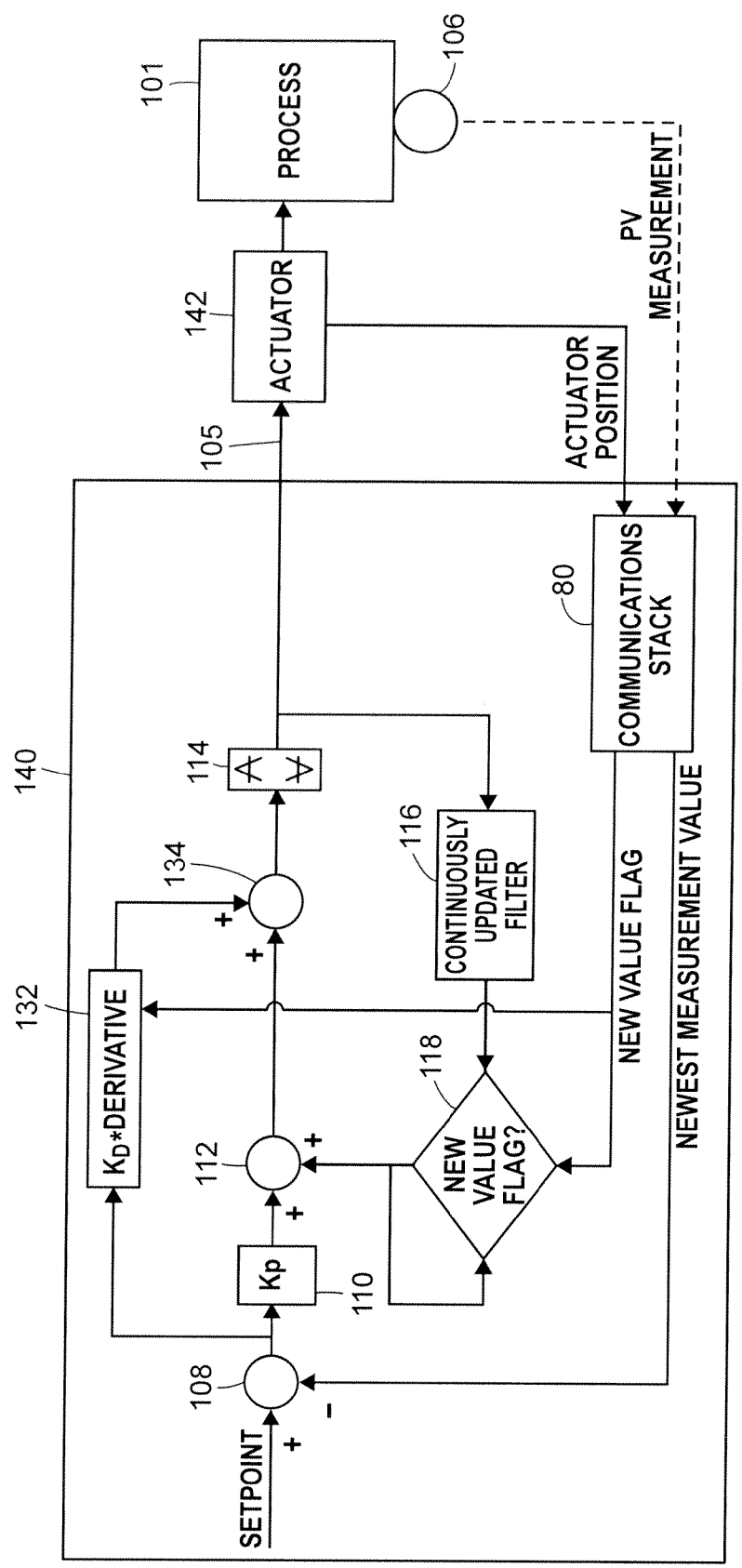
FIG. 7 is a block diagram of an example controller that performs setpoint change compensation in a non-periodically updated process control system in which the process controller receives additional controller-input data provided from a field device, a control element, or other downstream device to affect a response in the operation of the process.

FIG. 7 depicts an exemplary controller 140 that receives actuator position data from a downstream device or element responsive to the control signal. The downstream device or element often corresponds with an actuator providing a measurement of actuator position. More generally, the downstream device or element may correspond with, or include, a PID control block, control selector, splitter or any other device or element controlled by the control signal. In the exemplary case shown, the actuator position data is provided as an indication of the response to the control signal. As such, the actuator position data is utilized by the controller 140 during periods of continued execution of the control routine despite the absence of measurement updates of the process variable. To this end, a continuously updated filter 116 may receive the actuator position data via a communications stack 146 that establishes an interface for incoming feedback data. In this exemplary case, the feedback data includes two indications of responses to the control signal, the actuator position and the process variable.

As with the previous examples, the continuously updated filter 116 is configured to accommodate situations involving the absence of measurement updates for the process variable. The continuously updated filter 116 similarly recalculates its output during such absences despite the fact that only the filter output generated after receipt of a new measurement value flag is used in the summer 112. However, upon reception of a measurement update, the continuously updated filter 116 no longer relies upon feedback of the control signal to modify its output. Rather, the actual response data from the actuator is utilized as shown below:

$$F_N = F_{N-1} + (A_{N-1} - F_{N-1}) * \left(1 - e^{\frac{-\Delta T}{T_{Reset}}}\right)$$

where $F_N$=New filter output
$F_{N-1}$=Filter output last execution
$A_{N-1}$=Controller output last execution
$\Delta T$=Controller execution period
$T_{Reset}$=Reset time The use of an actual indication of the response to the control signal can help improve the accuracy of the control techniques, both during periods of periodic communications and after a period of non-periodic or lost communications from the PID control element to the downstream element, e.g., an actuator. However, the transmission of the actual response indication will typically require additional communications between a field device and the controller, if implemented in different devices. Such communications may be wireless, as described above, and therefore may be susceptible to unreliable transmissions or power constraints. Other reasons may also lead to the unavailability of the feedback data.

As described below, the control techniques discussed herein can also address situations in which such response indications are not communicated in a periodic or timely manner. That is, application of the control techniques need not be limited to the absence of measurement updates for the process variable. Rather, the control techniques may be advantageously utilized to address situations involving the absence of other response indications, such as the position of an actuator or the output of a downstream control element. Still further, the control techniques may be utilized to address situations involving the loss, delay or other unavailability of transmissions from the controller (or control element) to the downstream element, such as a field device (e.g., actuator) or another control element (e.g., cascaded PID control, splitter, etc.).

The wireless or other unreliable transmission of additional data to the controller or control element (i.e., the response indication or downstream element feedback), or from the controller or control element (i.e., the control signal), provides additional potential for communication issues and/or problems. As described above, feedback from the downstream element (e.g., actuator) may be involved in determining the integral contribution (or other control parameter or contribution). In this example, the control routine relies on two feedback signals rather than the single process variable fed back in the examples described above. Moreover, if the control signal never reaches the downstream element, the process will not receive the benefit of the control scheme. Transmissions of either one of these signals may be delayed or lost and, thus, the techniques described herein address either eventuality.

The absence of the response indication involved in the filter or other control computations may be addressed by maintaining the indication of the expected response (or other control signal component) until an update is received.

When the control signal does not reach the downstream element, the response indication (i.e., feedback) from the downstream element will not be changing. In such cases, the lack of a change in value may trigger logic in the controller (or control element) to similarly maintain the indication of the expected response (or other control signal component) until a change in value is received.

The control techniques may also be implemented in scenarios where actual feedback data is either not desired or is unavailable. The former case may be advantageous in those situations where the simplicity of using an implied response to the control signal is beneficial. For instance, the communication of the actual feedback data may be problematic or impractical. The latter case may involve actuators or other devices not configured to provide position measurement data, as described above. Older devices may not have such capabilities.

Figure 8:
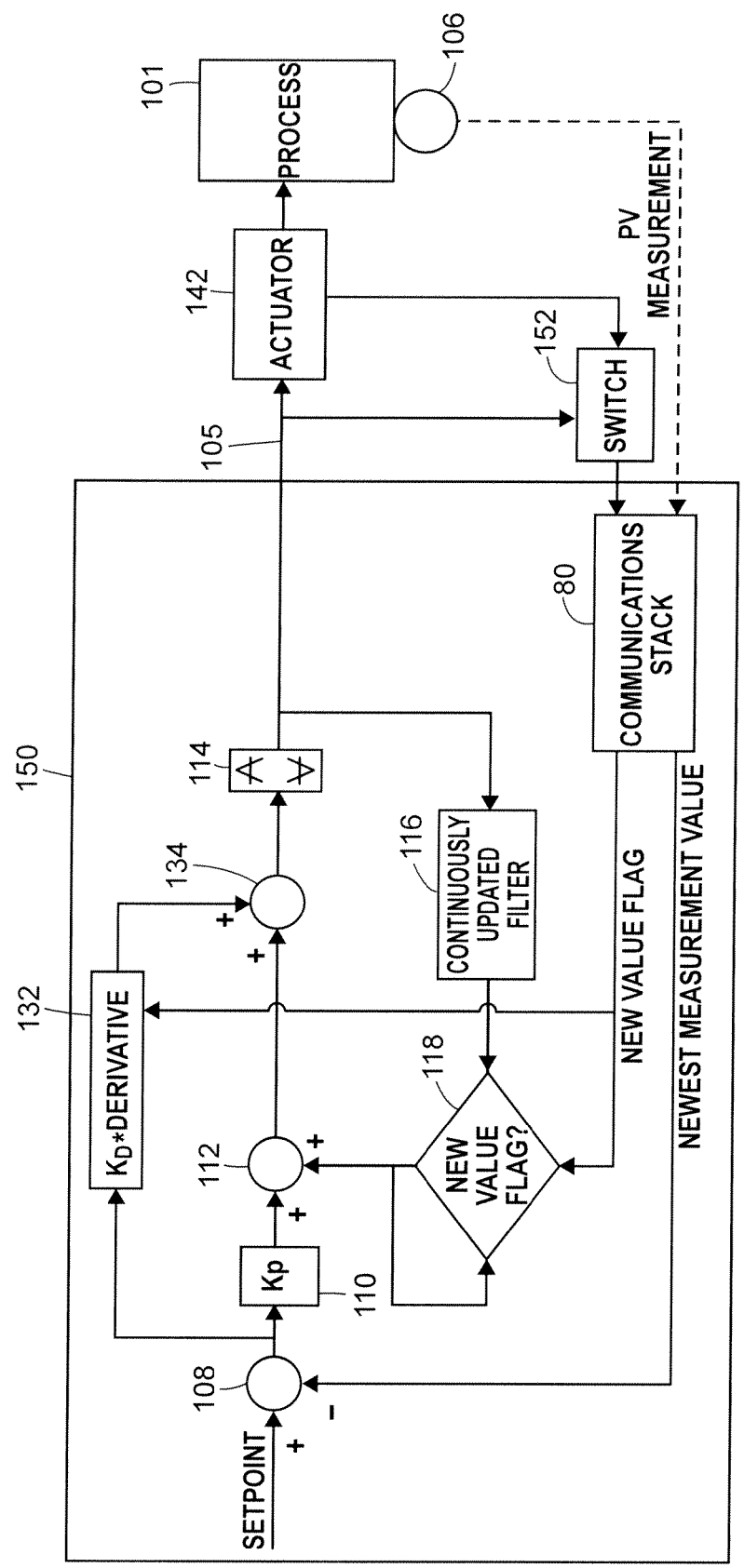
FIG. 8 is a block diagram of an example controller that performs setpoint change compensation in a non-periodically updated process control system in which the process controller accommodates the use of either actual or implied controller-input data for a field device.

To accommodate such devices, a switch or other device may be provided to allow either an implied or actual response indication to be used by the control techniques. As illustrated in FIG. 8, a controller 150 is coupled to a switch 152, which in turn receives both the implied and actual response indications. In this case, the controller 150 may be identical to any of the above-described controllers, inasmuch as the implementation of the control schemes is not dependent upon knowing the type of response indication. The switch 152 may be implemented in software, hardware, firmware, or any combination thereof. Control of the switch 152 may be independent of the controller 150 and the implementation of any control routine. Alternatively or additionally, the controller 150 may provide a control signal to configure the switch 152. Furthermore, the switch 152 may be implemented as a part of the controller itself and, in some cases, may be integrated as a part of the communications stack or other portion of the controller.

Practice of the control methods, system and techniques is not limited to any one particular wireless architecture or communication protocol. Suitable exemplary architectures and communication support schemes are described U.S. patent application Ser. No. 11/156,215 entitled "Wireless Architecture and Support for Process Control Systems," which was filed on Jun. 17, 2005, the entire disclosure of which is hereby incorporated by reference. In fact, the modifications to the control routines are well-suited for any context in which the control routine is implemented in a periodic manner, but without process variable measurement updates for each control iteration. Other exemplary contexts include where a sampled value is provided irregularly or more seldom by, for instance, an analyzer or via lab samples.

Practice of the control technique is not limited to use with single-input, single-output PID control routines (including PI and PD routines), but rather may be applied in a number of different multiple-input and/or multiple-output control schemes and cascaded control schemes. More generally, the control technique may also be applied in the context of any closed-loop model-based control routine involving one or more process variables, one or process inputs or other control signals, such as model predictive control (MPC).

The term "field device" is used herein, in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices such as valves, switches, flow control devices, etc.

It should be noted that any control routines or modules described herein may have parts thereof implemented or executed in a distributed fashion across multiple devices. As a result, a control routine or module may have portions implemented by different controllers, field devices (e.g., smart field devices) or other devices or control elements, if so desired. Likewise, the control routines or modules described herein to be implemented within the process control system may take any form, including software; firmware, hardware, etc. Any device or element involved in providing such functionality may be generally referred to herein as a "control element," regardless of whether the software, firmware, or hardware associated therewith is disposed in a controller, field device, or any other device (or collection of devices) within the process control system. A control module may be any part or portion of a process control system including, for example, a routine, a block or any element thereof, stored on any computer readable medium. Such control modules, control routines or any portions thereof (e.g., a block) may be implemented or executed by any element or device of the process control system, referred to herein generally as a control element. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

Alternatively or additionally, the function blocks may be stored in and implemented by the field devices themselves, or other control elements of the process control system, which may be the case with systems utilizing Fieldbus devices. While the description of the control system 10 is provided herein using a function block control strategy, the control techniques and system may also be implemented or designed using other conventions, such as ladder logic, sequential function charts, etc. or using any other desired programming language or paradigm.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the control techniques without departing from the spirit and scope of the invention.

The invention claimed is:

1. A method of controlling a process, comprising:
   implementing, on a computer processing device, multiple iterations of a control routine to generate a control signal including, during each iteration of the control routine;
   generating a feedback contribution from a continuously updated filter for use in producing the control signal including determining a new value of the feedback contribution for the current iteration of the control routine from a feedback contribution value of a preceding iteration of the control routine and a value of the control signal;
   using the new value of the feedback contribution to generate the control signal for the current iteration of the control routine when a new process response indication to the control signal is available from the process, and
   using a previously generated value of the feedback contribution to generate the control signal when a new process response indication to the control signal is not available from the process, the previously generated value of the feedback contribution being generated during a preceding iteration of the control routine as a result of the receipt of a preceding communication of a process response indication from the process; and
   using the control signal to control the process.

2. The method of claim 1, wherein the feedback contribution is a reset contribution.

3. The method of claim 2, wherein the feedback contribution includes a derivative contribution.

4. The method of claim 1, wherein the process response indication is a measurement of a process parameter being affected by the control signal.

5. The method of claim 4, wherein the process parameter is a process variable controlled by a field device responsive to the control signal.

6. The method of claim 1, wherein:
   the control routine is a proportional-integral-derivative (PID) control routine for controlling a process variable in accordance with a setpoint, wherein the PID control routine includes one of an integral component and a derivative component;
   the feedback contribution is generated by one of the integral component and the derivative component of PID control routine; and
   the process response indication comprises a measurement of either the process variable or a process parameter responsive to the control signal that affects the process variable.

7. The method of claim 1, wherein generating the feedback contribution for the control signal for an iteration of the control routine includes determining the new value of the feedback contribution as a summation of the feedback contribution value of the preceding iteration of the control routine and a component based on a difference between a current value of the control signal and the feedback contribution value of the preceding iteration of the control routine.

8. The method of claim 7, wherein determining the new value of the feedback contribution includes generating the component based on the difference between the current value of the control signal and the feedback contribution value of the preceding iteration of the control routine multiplied by a factor dependent on a reset time and a controller execution period.

9. The method of claim 1, wherein implementing the multiple iterations of the control routine to generate the control signal includes, during each iteration of the control routine, generating the control signal based on a setpoint value, a measurement of a process variable and the feedback contribution.

10. A device for controlling a process, comprising:
    a processor;
    a communication interface coupled to the processor to receive a process variable indication;
    a non-transitory computer readable medium; and
    a control routine stored on the computer readable medium that executes on the processor to produce a control signal based on the process variable indication, wherein the control routine executes during each of a plurality of execution cycles to generate the control signal and wherein the control routine
    generates a feedback contribution from a continuously updated filter during each execution cycle for use in producing the control signal;
    uses a new value of the feedback contribution to generate the control signal when a new process variable indication is received via the communication interface, the new value of the feedback contribution being generated during the current execution cycle of the control routine from a feedback contribution value a previous execution cycle of the control routine and a value of the control signal; and
    uses a previously generated value of the feedback contribution to generate the control signal when a new process variable indication is not received via the communication interface, the previously generated value of the feedback contribution being generated during a previous execution cycle of the control routine as a result of the receipt of a previous communication of a process variable indication.

11. The device of claim 10, where the communication interface includes a wireless communication unit that receives the process variable indication via a wireless transmission.

12. The device of claim 10, wherein the feedback contribution is a reset contribution.

13. The device of claim 10, wherein the feedback contribution includes a derivative contribution in which the feedback contribution is updated on detection of new measurement and based on derivative time constant and the time that has elapsed since the last measurement update.

14. The device of claim 10, wherein the control routine is a proportional-integral-derivative (PID) control routine for controlling a process variable in accordance with a setpoint, wherein the PID control routine includes one of an integral component and a derivative component which generates the feedback contribution, and wherein the process variable indication comprises a measurement of either the process variable or a process parameter responsive to the control signal that affects a process variable.

15. The device of claim 10, wherein the control routine generates the feedback contribution for the control signal by iteratively determining the new value of the feedback contribution as a summation of the feedback contribution value of the previous control routine execution cycle and a component based on a difference between a current value of the control signal and the feedback contribution value of the previous control routine execution cycle.

16. The device of claim 15, wherein the control routine generates the feedback contribution by determining the component based on the difference between the current value of the control signal and the feedback contribution value of the previous control routine execution cycle multiplied by a factor dependent on a reset time and a controller execution period.

17. A controller for producing a control signal to control a process based on a setpoint and a set of non-periodic measurements from the process, the controller comprising:
 a setpoint input that receives a setpoint value;
 a process variable input that receives non-periodic measurements of a process variable;
 a control signal generation unit coupled to the setpoint input and the process variable input that produces a control signal during each of a set of controller iterations based on the setpoint value, a measurement of the process variable and a feedback contribution;
 a continuously updated filter that generates a new value of the feedback contribution for each of the plurality of controller iterations, wherein the continuously updated filter generates each new value of the feedback contribution in accordance with a feedback contribution value of a previous controller iteration, and a value of the control signal produced by the control signal generation unit; and
 a switch coupled between the continuously updated filter and the control signal generation unit, wherein the switch provides a feedback contribution value that was generated by the continuously updated filter during a previous controller iteration as a result of the receipt of a previous communication of the process variable measurement to the control signal generation unit when a new process variable measurement value is unavailable at the process variable input and that provides the new value of the feedback contribution that was generated by the continuously updated filter during a current controller iteration when a new process variable measurement value is available at the process variable input.

18. The controller of claim 17, wherein the continuously updated filter comprises a reset contribution generation unit to develop a reset contribution signal as the feedback contribution.

19. The controller of claim 18, wherein the controller includes a derivative contribution generation unit to develop a derivative contribution signal as the feedback contribution.

20. The controller of claim 17, wherein the controller is a proportional-integral-derivative (PID) control routine for controlling a process variable in accordance with the setpoint, wherein the controller includes one of an integral component and a derivative component which includes the continuously updated filter, and wherein the process variable measurements comprise measurements of either a process variable or a process parameter responsive to the control signal that affects a process variable.

21. The controller of claim 17, wherein the continuously updated filter generates the new value of the feedback contribution as a summation of the feedback contribution value of the previous controller iteration and a component based on a difference between a current value of the control signal and the feedback contribution value of the previous controller iteration.

22. The controller of claim 17, wherein the continuously updated filter generates the new value of the feedback contribution by determining the component based on the difference between the value of the current control signal and the feedback contribution value of the previous controller iteration multiplied by a factor dependent on a reset time and a controller execution period.

* * * * *